US008635014B2

(12) United States Patent  
Jung et al.

(10) Patent No.: US 8,635,014 B2  
(45) Date of Patent: Jan. 21, 2014

(54) MAP-BASED GUIDE SYSTEM AND METHOD (75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 776 days.

(21) Appl. No.: 11/998,827

(22) Filed: Nov. 29, 2007

(65) Prior Publication Data

US 2008/0147312 A1    Jun. 19, 2008

Related U.S. Application Data (63) Continuation-in-part of application No. 11/086,973, filed on Mar. 22, 2005, now abandoned.

(51) Int. Cl.
*G01C 21/00* (2006.01)
*G06Q 99/00* (2006.01)
*G06Q 30/00* (2012.01)

(52) U.S. Cl.
USPC ........... 701/400; 701/117; 455/456.1; 342/36

(58) Field of Classification Search
USPC ............... 701/201, 400, 117; 455/456, 456.1; 342/36
See application file for complete search history.

(56) References Cited

U.S. PATENT DOCUMENTS

| | | | |
|---|---|---|---|
| 4,301,506 A | 11/1981 | Turco | |
| 4,528,552 A | 7/1985 | Moriyama et al. | |
| 4,546,439 A | 10/1985 | Esparza | |
| 4,570,227 A | 2/1986 | Tachi et al. | |
| 4,646,089 A | 2/1987 | Takanabe et al. | |
| 4,734,863 A | 3/1988 | Honey et al. | |
| 4,764,873 A | 8/1988 | Libby | |
| 4,796,189 A | 1/1989 | Nakayama et al. | |
| 4,866,626 A | 9/1989 | Egli | |
| 4,876,651 A | 10/1989 | Dawson et al. | |
| 4,890,104 A | 12/1989 | Takanabe et al. | |
| 4,914,605 A | 4/1990 | Loughmiller et al. | |
| 4,926,336 A | 5/1990 | Yamada | |
| 4,937,753 A | 6/1990 | Yamada | |
| 4,954,958 A | 9/1990 | Savage et al. | |
| 4,962,458 A | 10/1990 | Verstraete | |
| 4,974,170 A * | 11/1990 | Bouve et al. | 715/855 |
| 4,984,168 A | 1/1991 | Neukrichner et al. | |
| 5,031,104 A | 7/1991 | Ikeda et al. | |
| 5,041,983 A | 8/1991 | Nakahara et al. | |
| 5,067,081 A | 11/1991 | Person | |
| 5,115,399 A | 5/1992 | Nimura et al. | |
| 5,168,452 A | 12/1992 | Yamada et al. | |

(Continued)

OTHER PUBLICATIONS

U.S. Appl. No. 11/124,626, Jung et al.

(Continued)

*Primary Examiner* — Tuan C. To (57) ABSTRACT

Provided is a computer system and methods for a map-based guide. A method includes but is not limited to receiving a request for the map-based guide; determining a location associated with the request; preparing a route in accordance with the location associated with the request and in accordance with at least one of a profit-motive and/or a goodwill factor; and transmitting the map-based guide.

21 Claims, 4 Drawing Sheets

(56) References Cited

U.S. PATENT DOCUMENTS

| | | | |
|---|---|---|---|
| 5,170,353 A | 12/1992 | Verstraete | |
| 5,172,321 A | 12/1992 | Ghaem et al. | |
| 5,189,430 A | 2/1993 | Yano et al. | |
| 5,191,406 A | 3/1993 | Brandestini et al. | |
| 5,191,532 A | 3/1993 | Moroto et al. | |
| 5,231,584 A | 7/1993 | Nimura et al. | |
| 5,270,937 A | 12/1993 | Link et al. | |
| 5,274,387 A | 12/1993 | Kakihara et al. | |
| 5,293,163 A | 3/1994 | Kakihara et al. | |
| 5,802,526 A | 9/1998 | Fawcett et al. | |
| 5,844,570 A | 12/1998 | Curtright et al. | |
| 5,884,262 A | 3/1999 | Wise et al. | |
| 5,948,040 A | 9/1999 | DeLorme et al. | |
| 6,009,403 A | 12/1999 | Sato | |
| 6,084,882 A | 7/2000 | Ogura et al. | |
| 6,104,790 A | 8/2000 | Narayanaswami | |
| 6,119,095 A | 9/2000 | Morita | |
| 6,240,360 B1 | 5/2001 | Phelan | |
| 6,282,489 B1 | 8/2001 | Bellesfield et al. | |
| 6,321,158 B1 | 11/2001 | DeLorme et al. | |
| 6,347,299 B1 | 2/2002 | Holzman et al. | |
| 6,381,534 B2 | 4/2002 | Takayama et al. | |
| 6,493,428 B1 | 12/2002 | Hillier | |
| 6,496,842 B1 | 12/2002 | Lyness | |
| 6,498,982 B2 | 12/2002 | Bellesfield et al. | |
| 6,542,593 B1 | 4/2003 | Bowman-Amuah | |
| 6,553,309 B2 | 4/2003 | Uchida et al. | |
| 6,570,595 B2 | 5/2003 | Porter | |
| 6,636,803 B1 | 10/2003 | Hartz, Jr. et al. | |
| 6,680,999 B1 | 1/2004 | Garcia | |
| 6,718,017 B1 | 4/2004 | Price et al. | |
| 6,728,731 B2 | 4/2004 | Sarukkai et al. | |
| 6,731,625 B1 | 5/2004 | Eastep et al. | |
| 6,801,604 B2 | 10/2004 | Maes et al. | |
| 6,816,779 B2 | 11/2004 | Chen et al. | |
| 6,826,474 B2 | 11/2004 | Miyahara et al. | |
| 6,839,023 B1 | 1/2005 | Benco et al. | |
| 6,868,333 B2 | 3/2005 | Melen | |
| 6,957,250 B1 | 10/2005 | Nakano | |
| 6,993,350 B2* | 1/2006 | Katoh | 455/457 |
| 7,012,564 B2* | 3/2006 | Abraham | 342/357.68 |
| 7,058,507 B2 | 6/2006 | Saiki | |
| 7,103,368 B2* | 9/2006 | Teshima | 455/456.3 |
| 7,116,977 B1* | 10/2006 | Moton et al. | 455/419 |
| 7,236,173 B2 | 6/2007 | Chithambaram et al. | |
| 7,292,935 B2 | 11/2007 | Yoon | |
| 7,342,516 B2 | 3/2008 | Kato et al. | |
| 7,376,510 B1 | 5/2008 | Green | |
| 7,447,593 B2* | 11/2008 | Estkowski et al. | 701/301 |
| 7,505,757 B2* | 3/2009 | Rowitch et al. | 455/411 |
| 7,519,372 B2* | 4/2009 | MacDonald et al. | 455/456.1 |
| 7,565,155 B2* | 7/2009 | Sheha et al. | 455/456.1 |
| 7,577,520 B2* | 8/2009 | Nomura | 701/453 |
| 7,734,019 B1* | 6/2010 | Terpstra | 379/37 |
| 7,890,376 B2* | 2/2011 | Barrese et al. | 705/26.9 |
| 8,504,284 B2* | 8/2013 | Brulle-Drews et al. | 701/409 |
| 2002/0032035 A1* | 3/2002 | Teshima | 455/456 |
| 2002/0077745 A1* | 6/2002 | Ohmura et al. | 701/208 |
| 2002/0102993 A1* | 8/2002 | Hendrey et al. | 455/456 |
| 2002/0174003 A1 | 11/2002 | Redmann et al. | |
| 2003/0011467 A1 | 1/2003 | Suomela | |
| 2003/0036955 A1 | 2/2003 | Tanaka et al. | |
| 2003/0134648 A1 | 7/2003 | Reed et al. | |
| 2004/0015293 A1 | 1/2004 | Randazzo et al. | |
| 2004/0030493 A1 | 2/2004 | Pechatnikov et al. | |
| 2004/0054428 A1 | 3/2004 | Sheha et al. | |
| 2004/0070620 A1 | 4/2004 | Fujisawa | |
| 2004/0107220 A1 | 6/2004 | Natesan et al. | |
| 2004/0172192 A1 | 9/2004 | Knutson | |
| 2004/0193707 A1 | 9/2004 | Alam et al. | |
| 2004/0217884 A1 | 11/2004 | Samadani et al. | |
| 2004/0224703 A1 | 11/2004 | Takaki et al. | |
| 2004/0249955 A1 | 12/2004 | Wuerful | |
| 2004/0254723 A1 | 12/2004 | Tu | |
| 2005/0032556 A1 | 2/2005 | Bennett et al. | |
| 2005/0033511 A1* | 2/2005 | Pechatnikov et al. | 701/210 |
| 2005/0072116 A1 | 4/2005 | Bunte | |
| 2005/0102099 A1 | 5/2005 | Linn | |
| 2005/0102245 A1 | 5/2005 | Edlund et al. | |
| 2005/0113123 A1 | 5/2005 | Torvinen | |
| 2005/0131643 A1 | 6/2005 | Shaffer et al. | |
| 2006/0040670 A1 | 2/2006 | Li et al. | |
| 2006/0058948 A1 | 3/2006 | Blass et al. | |
| 2006/0123014 A1 | 6/2006 | Ng | |
| 2006/0168592 A1 | 7/2006 | Andrews et al. | |

OTHER PUBLICATIONS

U.S. Appl. No. 11/047,465, Jung et al.
U.S. Appl. No. 11/058,399, Jung et al.
U.S. Appl. No. 11/066,112, Jung et al.
U.S. Appl. No. 11/050,642, Jung et al.
U.S. Appl. No. 11/086,973, Jung et al.
U.S. Appl. No. 11/998,450, Jung et al.
U.S. Appl. No. 11/998,871, Jung et al.
U.S. Appl. No. 12/231,314, Jung et al.
U.S. Appl. No. 12/231,325, Jung et al.
Bobrich, Joachim, et al.; "Augented Maps"; Symposium on Geospatial Theory, Processing and Applications; bearing a date of 2002; University of Hanover.
"Espatial: iSMART" Overview; bearing a date of Feb. 8, 2005; 3 pp.; located at www.espatial.com/page455.html.
Gluck, Myke, Ph.D., et al.; "Augmented Seriation: Usability of a Visual and Auditory Tool for Geographic Pattern Discovery with Risk Perception Data"; GeoComputation; bearing a date of 1999; p. 1.
Hall, T. Brett et al.; "A Novel Interactivity Environment for Integrated Intelligent Transporation and Telematic Systems"; 5th Intl. IEEE Conf.; bearing a date of Sep. 3, 2002; Singapore.
"Introduction to Augmented Reality"; bearing a date of Dec. 15, 2004; 11 pages; located at www.se.rit.edu/-jrv/research/ar/introction.html.
Lowe, Jonathan W.; "Raster-Oriented Technology Supports Public Internet Applications That Manage larger Raster Collections," Geospatial Solutions; bearing a date of Oct. 2004; 4 pages.
"Seattle Area Traffic Home Web Page"; bearing a date of Dec. 10, 2004, 11:14 A.M.; located at www.wsdot.wa.gov/traffic/seattle.
Wei, Li-Yi and LeVoy, Marc; "Fast Texture Synthesis Using Tree-Structured Vector Quantization"; pp. 1-10; Stanford University.
Zhong, David X.; "Color Space Analysis and Color Image Segmentation"; pp. 1-5; School of Electrical and Information Engineering, The University of Sydney.
Hristova et al.; "Ad-me: Wireless Advertising Adapted to the User Location, Device and Emotions"; 37th Hawaii International Conference on System Sciences; bearing a date of 2004; pp. 1-10; 0-7695-2056-1/04; © 2004 IEEE.

\* cited by examiner

MAP-BASED GUIDE SYSTEM AND METHOD

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS:

For purposes of the USPTO extra-statutory requirements, the present application constitutes a continuation-in-part of U.S. patent application Ser. No. 11/086,973 entitled MAP-BASED GUIDE SYSTEM AND METHOD, naming Edward K. Y. Jung, Royce A. Levien, Robert W. Lord, Mark A. Malamud, and John D. Rinaldo, Jr. as inventors, filed Mar. 22, 2005 now abandoned which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The present application relates generally to maps.

SUMMARY

In one aspect, a method for adjusting a map-based guide includes but is not limited to receiving a request for the map-based guide; determining a location associated with the request; preparing a route in accordance with the location associated with the request and in accordance with at least one of a profit-motive and/or a goodwill factor; and transmitting the map-based guide. In addition to the foregoing, other method aspects are described in the claims, drawings, and text forming a part of the present application.

In another aspect, a method for a display device to receive a map-based guide through a predefined area includes but is not limited to transmitting a request for the map-based guide of the predefined area, the request including an identifier associated with the display device; and receiving the map-based guide of the predefined area, the map-based guide including a route through the predefined area based on the identifier, the identifier enabling a server-based decision-making process to determine the routing. In addition to the foregoing, other method aspects are described in the claims, drawings, and text forming a part of the present application.

In another aspect, a computer program product can include a signal bearing medium bearing one or more instructions including, but not limited to one or more instructions for receiving a request for the map-based guide; determining a location associated with the request; preparing a route in accordance with the location associated with the request and in accordance with at least one of a profit-motive and/or a goodwill factor; and transmitting the map-based guide. In addition to the foregoing, other program product aspects are described in the claims, drawings, and text forming a part of the present application.

In another aspect, a computer program product can include a signal bearing medium bearing one or more instructions including, but not limited to one or more instructions for transmitting a request from a display device, the request for a map-based guide of a predefined area, the request including an identifier associated with the display device; and instructions for receiving the map-based guide of the predefined area, the map-based guide including a route through the predefined area based on the identifier, the identifier enabling a server-based decision-making process to determine the routing. In addition to the foregoing, other program product aspects are described in the claims, drawings, and text forming a part of the present application.

In another aspect a computer program product can include a signal bearing medium bearing one or more instructions including, but not limited to, one or more instructions for receiving a request for a map-based guide from a source, the map-based guide providing a route through a predefined area; one or more instructions for determining a location associated with the request; one or more instructions for determining a level associated with remuneration if the source has provided remuneration, the route through the predefined area being a function of the level associated with the remuneration; and one or more instructions for transmitting the map-based guide. In addition to the foregoing, other program product aspects are described in the claims, drawings, and text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to a processor; a memory coupled to the processor; a receiver coupled to the processor; and a map-based guide module coupled to the receiver and the memory. The map-based guide module can include a data store configurable to hold data related to routes through a predefined area and a route determination module coupled to the data store, the route determination module configurable to determine a route through the predefined area based on an identifier received by the receiver, the identifier determinative of a number and type of locations to include with a route to include in a map-based guide through the predefined area. In addition to the foregoing, other system aspects are described in the claims, drawings, and text forming a part of the present application.

In addition to the foregoing, various other method, system, and/or computer program product aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the text set forth herein.

BRIEF DESCRIPTION OF THE DRAWINGS

A better understanding of the subject matter of the application can be obtained when the following detailed description of the disclosed embodiments is considered in conjunction with the following drawings, in which.

DETAILED DESCRIPTION OF THE DRAWINGS

Those with skill in the computing arts will recognize that the disclosed embodiments have relevance to a wide variety of applications and architectures in addition to those described below. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

Figure 1:
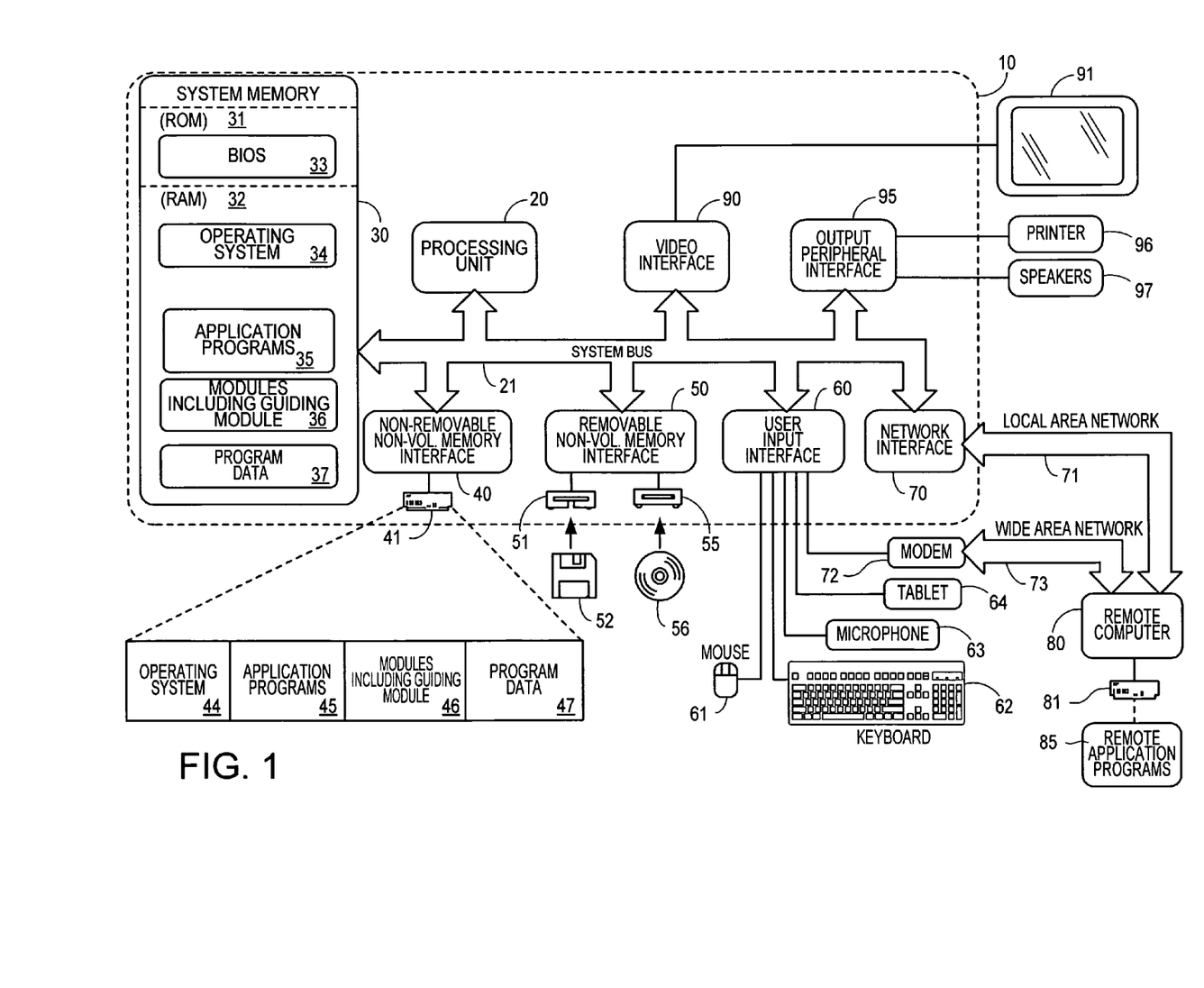
FIG. 1 is a block diagram of an exemplary computer architecture that supports the claimed subject matter.

With reference to FIG. 1, depicted is an exemplary computing system for implementing the embodiments and includes a general purpose computing device in the form of a computer 10. Components of the computer 10 may include, but are not limited to, a processing unit 20, a system memory 30, and a system bus 21 that couples various system components including the system memory 30 to the processing unit 20. The system bus 21 may be any of several types of bus structures including, but not limited to, a memory bus or memory controller, a peripheral bus, and/or a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 10 typically includes a variety of computer readable media. Computer readable media can be any available media that can be accessed by the computer 10 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 10. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 30 includes computer storage media in the form of volatile and/or nonvolatile memory such as read only memory (ROM) 31 and random access memory (RAM) 32. A basic input/output system 33 (BIOS), containing the basic routines that help to transfer information between elements within computer 10, such as during start-up, is typically stored in ROM 31. RAM 32 typically contains data and/or program modules that are immediately accessible to and/or presently being operated on by processing unit 20. By way of example, and not limitation, FIG. 1 illustrates operating system 34, application programs 35, other program modules 36, and program data 37. FIG. 1 is shown with program modules 36 including a guiding module in accordance with an embodiment as described herein.

The computer 10 may also include other removable/non-removable, volatile/nonvolatile computer storage media. By way of example only, FIG. 1 illustrates a hard disk drive 41 that reads from or writes to non-removable, nonvolatile magnetic media, a magnetic disk drive 51 that reads from or writes to a removable, nonvolatile magnetic disk 52, and an optical disk drive 55 that reads from or writes to a removable, nonvolatile optical disk 56 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, or the like. The hard disk drive 41 is typically connected to the system bus 21 through a non-removable memory interface such as interface 40, and magnetic disk drive 51 and optical disk drive 55 are typically connected to the system bus 21 by a removable memory interface, such as interface 50.

The drives and their associated computer storage media, discussed above and illustrated in FIG. 1, provide storage of computer readable instructions, data structures, program modules and other data for the computer 10. In FIG. 1, for example, hard disk drive 41 is illustrated as storing operating system 44, application programs 45, other program modules, such as guiding module 46 and program data 47. Program modules 46 is shown including an guiding module, which can be configured as either located in guiding modules 36 or 46, or both locations, as one with skill in the art will appreciate. Note that these components can either be the same as or different from operating system 34, application programs 35, other program modules, guiding module 36, and program data 37. Operating system 44, application programs 45, guiding module 46, and program data 47 are given different numbers here to illustrate that, at a minimum, they are different copies. A user may enter commands and information into the computer 10 through input devices such as a tablet or electronic digitizer 64, a microphone 63, a keyboard 62 and pointing device 61, commonly referred to as a mouse, trackball or touch pad. Other input devices (not shown) may include a joystick, game pad, satellite dish, scanner, or the like. These and other input devices are often connected to the processing unit 20 through a user input interface 60 that is coupled to the system bus, but may be connected by other interface and bus structures, such as a parallel port, game port or a universal serial bus (USB). A monitor 91 or other type of display device is also connected to the system bus 21 via an interface, such as a video interface 90. The monitor 91 may also be integrated with a touch-screen panel or the like. Note that the monitor and/or touch screen panel can be physically coupled to a housing in which the computing device 10 is incorporated, such as in a tablet-type personal computer. In addition, computers such as the computing device 10 may also include other peripheral output devices such as speakers 97 and printer 96, which may be connected through an output peripheral interface 95 or the like. A display device, for purposes of this patent application can include an e-paper display, a liquid crystal display or the like.

The computer 10 may operate in a networked environment using logical connections to one or more remote computers, such as a remote computer 80. The remote computer 80 may be a personal computer, a server, a router, a network PC, a peer device or other common network node, and typically includes many or all of the elements described above relative to the computer 10, although only a memory storage device 81 has been illustrated in FIG. 1. The logical connections depicted in FIG. 1 include a local area network (LAN) 71 and a wide area network (WAN) 73, but may also include other networks. Such networking environments are commonplace in offices, enterprise-wide computer networks, intranets and the Internet. For example, in the subject matter of the present application, the computer system 10 may comprise the source machine from which data is being migrated, and the remote computer 80 may comprise the destination machine. Note however that source and destination machines need not be connected by a network or any other means, but instead, data may be migrated via any media capable of being written by the source platform and read by the destination platform or platforms.

When used in a LAN or WLAN networking environment, the computer 10 is connected to the LAN through a network interface or adapter 70. When used in a WAN networking environment, the computer 10 typically includes a modem 72 or other means for establishing communications over the WAN 73, such as the Internet. The modem 72, which may be internal or external, may be connected to the system bus 21 via the user input interface 60 or other appropriate mechanism. In a networked environment, program modules depicted relative to the computer 10, or portions thereof, may be stored in the remote memory storage device. By way of example, and not limitation, FIG. 1 illustrates remote application programs 85 as residing on memory device 81. It will be appreciated that the network connections shown are exemplary and other means of establishing a communications link between the computers may be used.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those of skill in the art will appreciate that some of the acts and operations described hereinafter can also be implemented in hardware.

Figure 2:
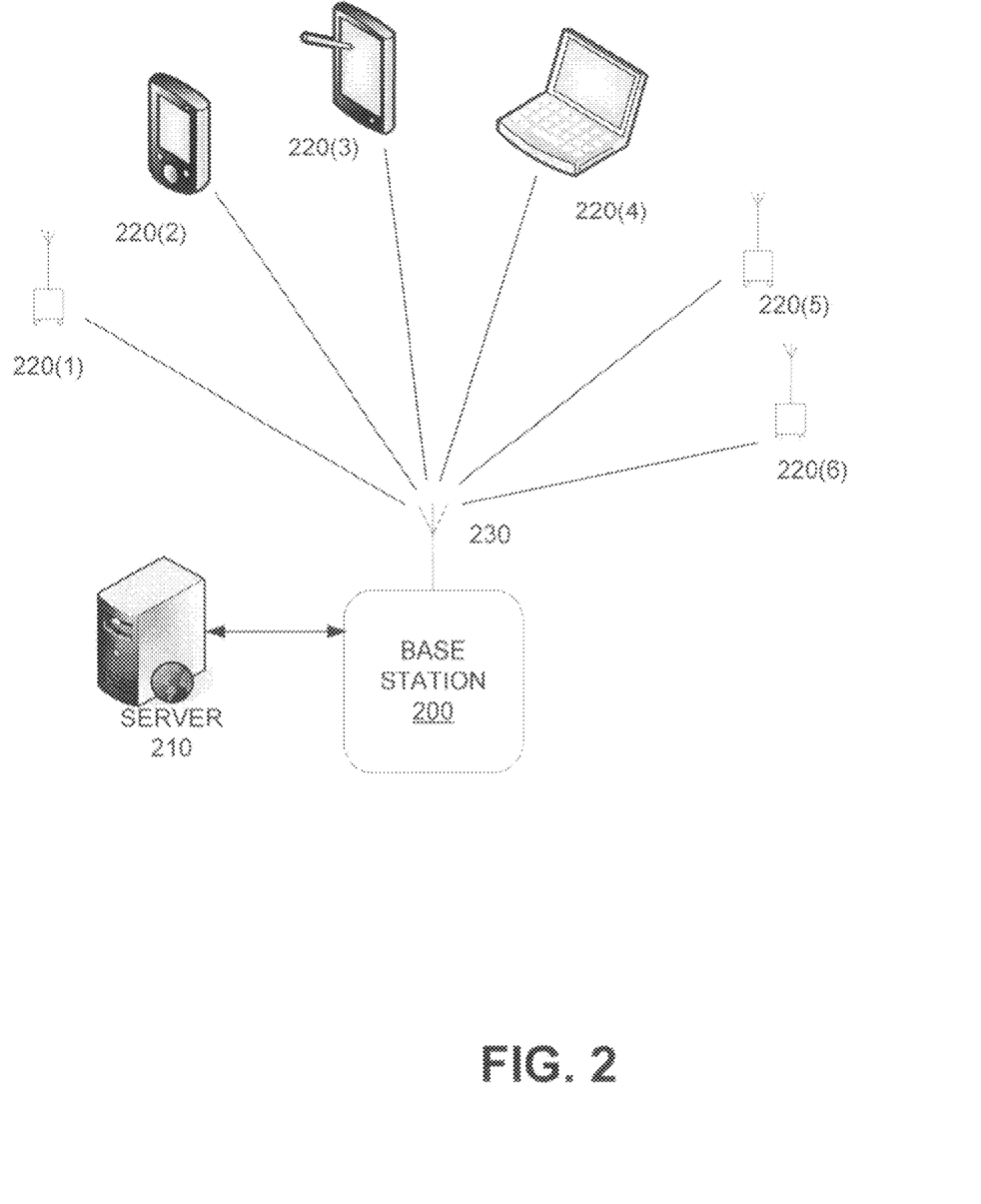
FIG. 2 is a block diagram of a wireless computer environment appropriate for embodiments of the subject matter of the present application.

Referring to FIG. 2, a diagram of a wireless network appropriate for some embodiments herein is shown. The wireless network includes a base station 200, which can be coupled to a server 210. Base station 200 interacts with a plurality of wireless components 220, which can be receivers only, designed to receive real time images and associated data as correlated and transmitted by server 210. Components interact with base station 200 via wireless connection 230. The wireless connection 230 could include a Global Positioning System (GPS), radio-frequency (RF) methods, or wireless local area network (WLAN). Another type of wireless connection could be a tracking tag system. Tracking tags typically communicate with a base station, each tag transmitting a unique code to identify a display device to which it is attached. WLANs operate by connecting mobile devices to a base station and using signal strength sensing to determine a location of a mobile device. Other wireless connections appropriate for embodiments include satellite connections, IEEE 802.11 connections or Bluetooth-type connections or the like as one of skill in the art with the benefit of the present disclosure will appreciate.

Components 220 can include receivers and transmitters to interact with server 210. Components 220 are shown including different types of components, including components 220(1) which could be a simple device capable of only receiving and displaying data and images. The data may include one or more of written directions, a map, and images or the like. Component 220(2) is shown as a personal electronic assistant, which could be configured to both send and/or receive data, display maps and/or directions as generated by server 210. Component 220(3) is shown as a tablet personal computer (PC) which can also be configured to both send and/or receive data. Component 220(4) is shown as a laptop or notebook computer which can also send and/or receive data and/or directions. Components 220(5) could be implemented as a simple mobile device which could be configured to receive and display images that could be in real time. Component 220(6) could be implemented as a cellular telephone or pager and include a display configured to show a map and images in accordance with embodiments herein.

In an alternative embodiment, components 220 could be devices that are not coupled to a wireless network of any kind. Rather, in the embodiment, a component 220 could be configured to receive data and store data internally for later mobile use.

Figure 3:
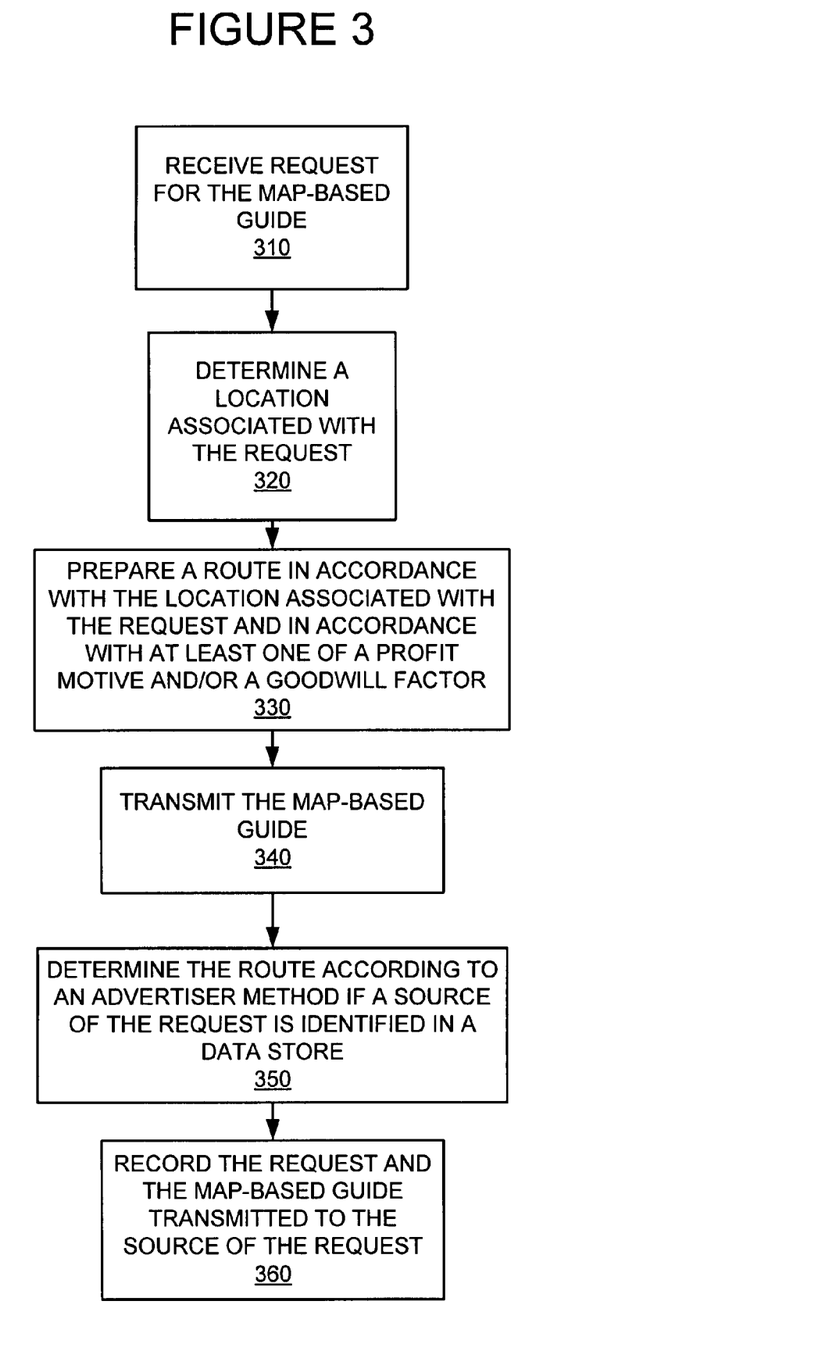
FIG. 3 is a flow diagram illustrating a method in accordance with an embodiment of the subject matter of the present application.

Referring now to FIG. 3, a flow diagram illustrates a method in accordance with an embodiment, in which the components wirelessly connected to the base station 200 and server 210 are coupled to receive map-based guides of an area. More particularly, the embodiment is directed to a method for adjusting a map-based guide. Block 310 provides for receiving a request for the map-based guide. More particularly, in an embodiment, the request can include an identifier associated with a destination in a predefined area and a location parameter identifying a starting location, the request being for a map-based guide from the starting location to the destination. Also, the receiving a request can include receiving a transmission from a mobile device wirelessly transmitting the request to a server.

Block 320 provides for determining a location associated with the request. In an embodiment, the determining can be accomplished by associating the request with a data store entry in the data store, the data store identifying whether a source of the request is entitled to a supported map-based guide. A supported map-based guide can mean a map-based guide that is supported as determined by a server. A supported map-based guide can also mean a map-based guide for which compensation for the map-based guide is provided by another form of support than the source of the request. For example, in one embodiment, the compensation for the map-based guide can come from advertisers that would have the server provide a map-based guide that directs the source past locations chosen by the advertiser. Thus, the supported map-based guide can include any guide for which compensation is from an advertiser, at least in part. To determine whether compensation has been received the data store can provide entries associated with sources that have provided compensation. If a source has no entry associated in the data store, in an embodiment, the server can assume that no compensation has been provided.

Matching the association with a data store entry in the data store can also include comparing the source to a list of sources that have provided remuneration for the map-based guide and determining a level associated with the remuneration if the source has provided remuneration. Thus, if at least partial compensation is provided by the source, then the number of locations an advertiser would prefer to have the source receive in a route can be limited.

In one embodiment, the route through the predefined area can be a function of the level associated with the remuneration. For example, the map-based guide could provide an efficient route through the predefined area if the level indicates a higher level of remuneration from the source. Conversely, a lower level of remuneration from the source could cause the server to provide a higher level of advertiser-chosen locations in a route to be provided to the source. As another example, the map-based guide can be configured to be source-centric. More particularly, in an embodiment, providing a source-centric route through the predefined area can include adjusting an influence of either or both of a profit motive and/or goodwill if the level associated with remuneration indicates a higher level of remuneration from the source. The remuneration can be in the form of payment or in the form of charitable works. For example, if a source has volunteered for an organization, rather than payment, the remuneration can be in the form of volunteer hours performed or the like.

Block 330 provides for preparing a route in accordance with the location associated with the request and in accordance with at least one of a profit-motive and/or a goodwill factor. In one embodiment, the preparing can include determining a supported map-based guide for transmission, the supported map-based guide providing the route. The route can include guiding past one or more locations associated with compensation for providing the route past the location, guiding based on a profit motive, and/or guiding based on a server-directed decision-making process and/or a goodwill motive. More particularly, the preparing in accordance with a profit motive and/or a goodwill factor can include preparing a route in accordance with the profit motive, the profit motive including a revenue-generating goal known to a server preparing the route. The route can include commercial establishments as a function of meeting the revenue-generating goal. Thus, for example, if the revenue-generating goal is met, the route can include fewer or no commercial establishments. In another embodiment, preparing a route in accordance with the goodwill factor can include directing the route past one or more server-directed locations that are determined according to a predetermined number of visitors for the one or more server-directed locations. Thus, rather than a profit motive, the route can include directing patrons past a location to increase goodwill for the location or an establishment near the location. For example, an amusement park with a new ride therein can develop goodwill for the new ride by having a server direct patrons past the new ride. Additionally, the goodwill can be a business-related goodwill or goodwill that is independent of a business relationship. For example, goodwill can be based on charitable goals known to a server, such as guiding past a humane society establishment to encourage those following the route to adopt homeless animals or the like.

Block 340 provides for transmitting the map-based guide. In one embodiment, the map-based guide of the predefined area to the source can include a bundle of one or more advertising locations in the map-based guide.

Block 350 provides for determining the route according to an advertiser method if the source of the request is identified in a data store. The determining the route according to an advertiser method if the source of the request is identified in the data store can include associating the identifier with a status hierarchy, the status hierarchy providing a number of advertiser locations by which the route is directed.

Block 360 provides for recording the request and the map-based guide transmitted to the source of the request. The recording the request and the map-based guide transmitted to the source of the request can include altering the data store to indicate the request, and associating one or more locations on the route with the source of the request.

Figure 4:
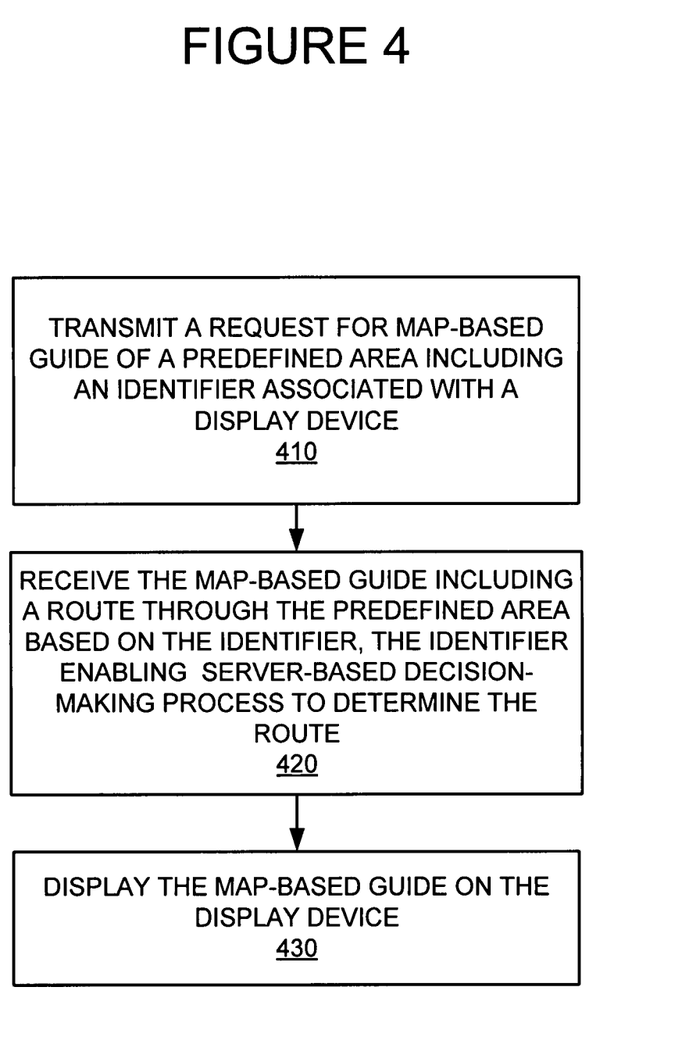
FIG. 4 is a flow diagram illustrating a method in accordance with an embodiment of the subject matter of the present application.

Referring now to FIG. 4, a flow diagram illustrates a method for a display device to receive a map-based guide through a predefined area. Block 410 provides for transmitting a request for the map-based guide of the predefined area, the request including an identifier associated with the display device. The request can include the identifier to enable determining whether the identifier is located on a data store on a server. More particularly, a server receiving the identifier can use the identifier to determine the route through the predefined area according to a server-based decision-making process by matching the identifier to an entry on the data store to determine a number of advertiser locations to include with the route.

Block 420 provides for receiving the map-based guide of the predefined area, the map-based guide including a route through the predefined area based on the identifier. The identifier can enable a server-based decision-making process to determine the routing. The receiving the map-based guide of the predefined area, the map-based guide including a route through the predefined area based on the identifier, the identifier enabling a server-based decision-making process to determine the routing can include receiving one or more advertisements with the map-based guide, the advertisements associated with one or more locations on the route through the predefined area. The receiving can also include connecting with a server, the server determining the route through the predefined area according to the server-based decision-making process. The connecting to the server can be over a wireless network by transmitting via one of a wireless LAN (WLAN), an IEEE 802 type wireless network, a Bluetooth type wireless network, and/or a satellite network.

Block 430 provides for displaying the map-based guide on the display device, the map-based guide providing the route to a destination included in the request.

Referring back to FIG. 1, in one embodiment, a computer system includes a module, shown in FIG. 1 as map-based guide modules 36 and 46. Map-based guide modules 36 and 46 can be coupled to a computer system memory and processor. For purposes of the present application, a map-based guide module coupled to the memory can include but is not limited to a map-based guide module with all module components within the memory, a map-based guide module only partially coupled to the memory and partially coupled to other components such as to firmware, and/or a map-based guide module including only some components coupled to the memory and other components in another memory, such as RAM or ROM or a storage that can be manipulated.

In an embodiment, the map-based guide module is configurable to create one or more map-based guides for a predefined area. The map-based guide module can be included with a mobile device or can be included as part of a server, such as server 210 that creates transmissions for the mobile device to display. If a server performs the processing, an embodiment includes a transmitter configured to transmit the map-based guide to the mobile device. The map-based guide can also be transmitted to a fixed device, such as a display device.

In one embodiment, a computer system can include a processor, a memory coupled to the processor, a receiver coupled to the processor, and/or a map-based guide module coupled to the receiver and the memory. In the embodiment, the map-based guide module includes a data store configurable to hold data related to routes through a predefined area. More particularly, the data can include many possible routes through an area including, but not limited to, routes going past locations related to advertisers supporting the computer system via remuneration. The data store can also include a table of identifiers associated with possible sources of requests for map-based guides.

The map-based guide module further includes a route determination module coupled to the data store. The route determination module can be configurable to determine a route through the predefined area based on an identifier received by the receiver. For example, an identifier can be from a source of a request for a map-based guide. The identifier can be determinative of a number of locations and a type of locations to include with a route to include in a map-based guide through the predefined area. For example, the identifier can identify whether the map-based guide providing the route should include guiding past one or more locations associated with compensation for providing the route past the location, guiding based on a profit motive, and/or guiding based on a server-directed decision-making process.

In one embodiment, the computer system includes a transmitter coupled to the processor. The transmitter can be configurable to transmit the map-based guide to a display device. The display device be a mobile device, such as a cell phone, a computer device, a PDA or the like configurable to transmit a request for the map-based guide to include the route being through the predefined area.

While the subject matter of the application has been shown and described with reference to particular embodiments thereof, it will be understood by those skilled in the art that the foregoing and other changes in form and detail may be made therein without departing from the spirit and scope of the subject matter of the application, including but not limited to additional, less or modified elements and/or additional, less or modified steps performed in the same or a different order.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

We claim:

1. A computer program product, comprising one or more non-transitory computer readable media bearing one or more instructions for:
   transmitting a transmission from a display device, the transmission including at least:
      a starting point;
      a destination;
      a request for a route from the starting point to the destination; and
      an identifier associated with the display device, the identifier enabling a server-based decision-making process to determine whether the request is entitled to a direct route from the starting point to the destination and, if the request is not entitled to a direct route from the starting point to the destination, the identifier enabling the server-based decision-making process to determine an indirect route from the starting point to the destination that guides the requestor past at least one location of at least one entity providing compensation for determining the indirect route, wherein the at least one location would not be included in the direct route from the starting point to the destination; and
   receiving the determined route from the starting point to the destination.

2. The computer program product of claim 1, wherein enabling the server-based decision-making process to determine an indirect route from the starting point to the destination that guides the requestor past at least one location of at least one entity providing compensation for determining the indirect route comprises:
   enabling the server-based decision-making process to determine an indirect route from the starting point to the destination that guides the requestor past at least one location of at least one advertiser, including at least guiding past at least one location of at least one advertiser that is neither the starting point nor the destination.

3. The computer program product of claim 1, wherein enabling a server-based decision-making process to determine whether the request is entitled to a direct route from the starting point to the destination comprises:
   enabling a server-based decision-making process to determine whether a source of the request associated with the display device has provided at least some compensation for receiving a route.

4. The computer program product of claim 1, wherein enabling the server-based decision-making process to determine an indirect route from the starting point to the destination that guides the requestor past at least one location of at least one entity providing compensation for determining the indirect route comprises:

enabling the server-based decision-making process to determine an indirect route from the starting point to the destination that guides the requestor past at least one location of at least one advertiser that has provided compensation for providing the route past the at least one location, wherein the at least one location does not include the starting point and wherein the at least one location does not include the destination.

5. The computer program product of claim 1, wherein enabling the server-based decision-making process to determine an indirect route from the starting point to the destination that guides the requestor past at least one location of at least one entity providing compensation for determining the indirect route comprises:

enabling the server-based decision-making process to determine an indirect route in accordance with a profit motive of one or more advertisers providing compensation for determining the indirect route, the profit motive including at least a revenue-generating goal, wherein the route includes at least guiding past one or more commercial establishments associated with the one or more advertisers as a function of meeting the revenue-generated goal.

6. The computer program product of claim 1, wherein enabling the server-based decision-making process to determine an indirect route from the starting point to the destination that guides the requestor past at least one location of at least one entity providing compensation for determining the indirect route comprises:

enabling the server-based decision-making process to determine an indirect route in accordance with a goodwill factor associated with the route, the goodwill factor including at least directing the route past one or more locations determined according to a predetermined number of visitors for the one or more locations.

7. The computer program product of claim 1, further comprising:

connecting with a server, the server determining the route from the starting point to the destination according to the server-based decision-making process.

8. The computer program product of claim 1, further comprising:

wirelessly transmitting the transmission from a display device to a server over a wireless network.

9. The computer program product of claim 1, wherein the identifier enabling a server-based decision-making process to determine whether the request is entitled to a direct route from the starting point to the destination and, if the request is not entitled to a direct route from the starting point to the destination, the identifier enabling the server-based decision-making process to determine an indirect route from the starting point to the destination that guides the requestor past at least one location of at least entity providing compensation for determining the indirect route, wherein the at least one location would not be the starting point or the destination comprises:

determining a route independent of traffic conditions along the determined route.

10. The computer program product of claim 1, wherein instructions for transmitting a transmission from a display device comprises:

transmitting the identifier to enable determining whether the identifier is located on a data store on a server, the server determining the route from the starting point to the destination according to the server-based decision-making process by matching the identifier to an entry on the data store to determine a number of advertiser locations to include with the route.

11. The computer program product of claim 1, wherein enabling a server-based decision-making process to determine whether the request is entitled to a direct route from the starting point to the destination comprises:

determining that a requestor of the route, the requestor associated with the display device, has provided remuneration for the route.

12. The computer program product of claim 11, wherein determining that a requestor of the route, the requestor associated with the display device, has provided remuneration for the route comprises:

searching a data store to determine whether the requestor has provided at least some remuneration for the route.

13. The computer program product of claim 12, wherein searching a data store to determine whether the requestor has provided at least some remuneration for the route comprises:

comparing the source of the request to a list of sources that have provided remuneration for the map-based guide.

14. The computer program product of claim 12, wherein searching a data store to determine whether the requestor has provided at least some remuneration for the route comprises:

comparing the source of the request to a list of sources that have performed volunteer hours for a charitable organization as remuneration for the map-based guide.

15. The computer program product of claim 1, wherein enabling a server-based decision-making process to determine whether the request is entitled to a direct route from the starting point to the destination comprises:

determining a route from the starting point to the destination including at least guiding past at least a first location that is not the starting point or the destination based upon a determination that the display device is entitled to the route for which compensation is provided by advertisers associated with the at least a first location.

16. A method, comprising:

receiving a request from a requestor for a route from a starting point to a destination; and determining, using one or more processing devices, whether the requestor is entitled to receive a direct route from the starting point to the destination and, if the requestor is not entitled to receive a direct route from the starting point to the destination, determining an indirect route from the starting point to the destination that guides the requestor past at least one location of at least one entity providing compensation for determining the indirect route, wherein the at least one location would not be included in the direct route from the starting point to the destination.

17. The method of claim 16, wherein determining, using one or more processing devices, whether the requestor is entitled to receive a direct route from the starting point to the destination and, if the requestor is not entitled to receive a direct route from the starting point to the destination, determining an indirect route from the starting point to the destination that guides the requestor past at least one location of at least one entity providing compensation for determining the indirect route, wherein the at least one location would not be included in the direct route from the starting point to the destination comprises:

determining a level of remuneration offered by the requestor for providing the requested direct route to the requestor; and determining one or more levels of compensation offered by the at least one entity for providing the indirect route to the requestor, the determining one or more levels of compensation offered by the at least one entity responsive to the level of remuneration offered by the requestor for providing the requested route to the requestor.

18. The method of claim 17, further comprising:

determining the direct route from the starting point to the destination if the level of remuneration offered by the requestor is sufficient for providing the requested route to the requestor and providing the direct route to the requestor; and determining the indirect route from the starting point to the destination that guides the requestor past at least one location of at least one entity providing compensation for determining the indirect route if the level of remuneration offered by the requestor is not sufficient for providing the requested route to the requestor and providing the indirect route instead of the direct route to the requestor.

19. The method of claim 18, wherein determining the indirect route from the starting point to the destination that guides the requestor past at least one location of at least one entity providing compensation for determining the indirect route if the level of remuneration offered by the requestor is not sufficient for providing the requested route to the requestor and providing the indirect route instead of the direct route to the requestor comprises:

determining the indirect route from the starting point to the destination that guides the requestor past at least one location of at least one entity providing compensation for determining the indirect route, wherein the at least one location is neither the starting point nor the destination.

20. The method of claim 16, wherein determining, using one or more processing devices, whether the requestor is entitled to receive a direct route from the starting point to the destination comprises:

determining whether the requestor has volunteered for a charitable organization and, if the requestor has volunteered for a charitable organization, determining whether the requestor has performed volunteer hours entitling the requestor to receive a direct route from the starting point to the destination.

21. A system for responding to requests for a route from a starting location to a destination, comprising:

circuitry for receiving a request from a requestor for a route from a starting point to a destination; and circuitry for determining whether the requestor is entitled to receive a direct route from the starting point to the destination and, if the requestor is not entitled to receive a direct route from the starting point to the destination, determining an indirect route from the starting point to the destination that guides the requestor past at least one location of at least one entity providing compensation for determining the indirect route, wherein the at least one location would not be included in the direct route from the starting point to the destination.

* * * * *